Sept. 30, 1958 P. C. BOWSER ET AL 2,854,100
VIBRATION DAMPER

Filed Nov. 15, 1954 2 Sheets-Sheet 1

Inventors
PHILLIP C. BOWSER
MAURICE OLLEY
By Paul Fitzpatrick
Attorney

Sept. 30, 1958 P. C. BOWSER ET AL 2,854,100
VIBRATION DAMPER
Filed Nov. 15, 1954 2 Sheets-Sheet 2
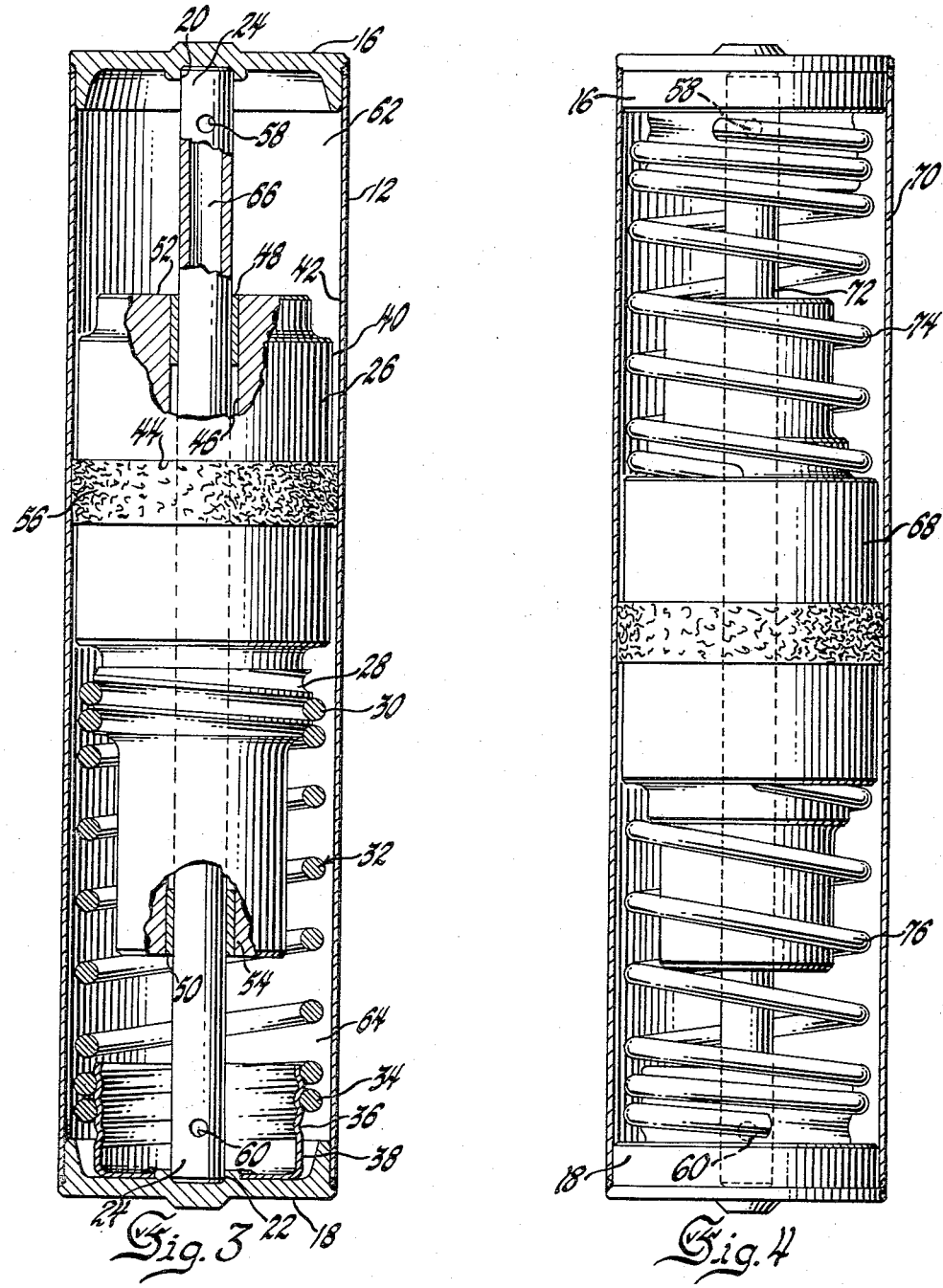
Inventors
PHILLIP C. BOWSER
MAURICE OLLEY
By Paul Fitzpatrick
Attorney

United States Patent Office 2,854,100
Patented Sept. 30, 1958

2,854,100

VIBRATION DAMPER

Phillip C. Bowser, St. Clair Shores, and Maurice Olley, Detroit, Mich., assignors to General Motors Corporation, Detroit, Mich., a corporation of Delaware Application November 15, 1954, Serial No. 468,606

7 Claims. (Cl. 188—103)

This invention relates to vibration dampers and more particularly, although not exclusively, to dynamic absorber type dampers adapted to counteract high frequency low amplitude wheel oscillation.

Under certain conditions, all the conventional types of vehicle suspensions are susceptible to an operating characteristic commonly referred to as wheel hop or axle tramp. Thus, when operating over rough or washboard type roads at certain speeds, the wheel tends to oscillate vertically at high frequency and produce undesirable operating characteristics in the vehicle, such as wheel fight, shimmy, reduced directional stability and reduced fuel economy.

While occurrence of high frequency low amplitude vibrations may be controlled to some extent by compromises in valving of conventional hydraulic shock absorbers, optimum efficiency of the shock absorber with respect to control of low frequency oscillation is necessarily reduced. Therefore, it is desirable that control of high frequency low amplitude vibrations be accomplished independently of the normal shock absorber equipment and thus permit utilization of shock absorbers having valving designed for optimum performance with respect to ride control.

An object of the present invention is to provide an inertia type vibration damper suitable for installation on any convenient part of the unsprung mass of a motor vehicle suspension.

Another object is to provide a dynamic absorber type vibration damper wherein a suitable mass is slidably confined in a cylindrical carrier, and yieldably maintained intermediately thereof, the vibrational freedom of the mass being tuned to provide one force impulse directly opposing each force impulse tending to build up wheel hop resonance.

A further object is to provide a device of the stated character having compressible fluid damping means, the degree of damping being regulated by flow restricting structure.

Still a further object is to provide a damper of the type described having air snubbing means adapted to prevent overstressing of the mechanism under conditions of severe oscillation of the mass.

Yet a further object is to provide a damper mechanism of the stated character wherein the various component parts require a minimum in machine operations in fabrication.

These and other objects and advantages of the invention will become more fully apparent as reference is had to the accompanying specification and drawings wherein:

Fig. 3 is an enlarged sectional elevational view showing the construction and arrangement of the operating parts of the invention, certain parts being broken away to more clearly illustrate the form thereof, and Fig. 4 is a view similar to Fig. 3 showing a modified form of the invention.

Figure 1:
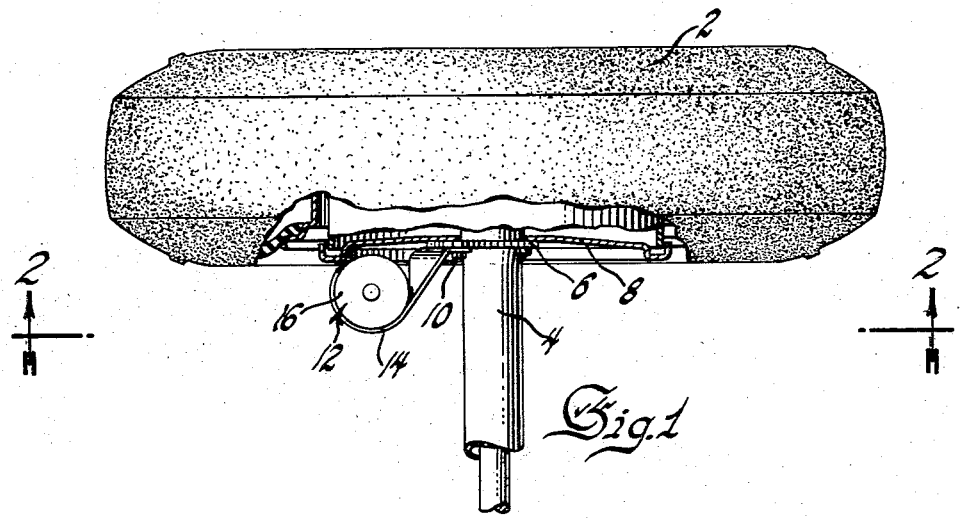
Fig. 1 is a plan view of a rear wheel and axle structure of a vehicle, certain parts being broken away and in section to more clearly illustrate the form and location of the invention.
Figure 2:
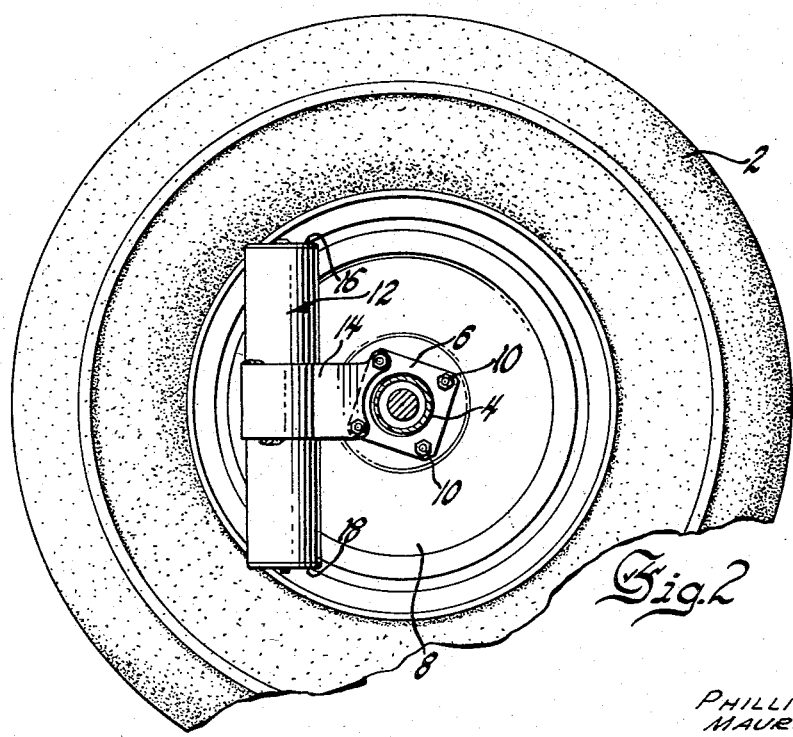
Fig. 2 is a fragmentary side elevational view showing the form and arrangement of the invention with respect to the rear vehicle wheel.

Referring now to the drawings and particularly Figs. 1 and 2, there is shown a rear vehicle wheel 2 which is rotatably supported on a vehicle axle housing 4. Axle housing 4 is provided with a flange 6 to which is secured a brake backing plate 8 by means of bolts 10. Disposed immediately adjacent the backing plate 8 is a vertically extending closed cylinder 12. Cylinder 12 is provided with a mounting bracket 14 which is secured thereto as by welding. Bracket 14 is bent to extend into cooperating engagement with certain of the apertures formed in flange 6 and is secured thereto by means of bolts 10, previously mentioned. Cylinder 12 functions in a manner providing vertical force impulses which oscillate out of phase with the excitation frequency of vertical oscillation of the rear wheel. It will, of course, be evident that this condition is encountered not only with respect to the rear wheels of the vehicle but also in connection with the front dirigible wheels. Consequently, it is to be understood that the invention is equally effective in connection with damping of vertical oscillations of the front wheels. The particular form and location of the damper with respect to the front wheels may take the form shown in Fig. 1 or may be mounted in any convenient location on the unsprung mass associated with front wheels. It is, however, preferable with respect to both the front and rear wheels that the damper be located in close proximity to the area of highest vibration amplitude or as near the outermost lateral extremities of the wheels as is permissible.

As seen best in Fig. 3, in order to provide tuned inertia forces directly opposing the resonant frequency of wheel hop, there is provided a dynamic absorber type vibration damper comprising a cylindrical tube 12 having stamped circular cap members 16 and 18 secured over the opposite ends thereof. Cap members 16 and 18 are formed with central depressed portions 20 and 22 which are adapted to receive the opposite ends of a hollow tubular member 24. When disposed in assembled relation, caps 16 and 18 maintain tubular member 24 interiorly of cylinder 12 and in concentric relation therewith. Caps 16 and 18 are thereafter secured in position, as by welding. Slidably disposed on tubular member 24 is a cylindrical mass 26 of suitable weight. It will be understood that the preferred weight of mass 26 will vary, depending upon the weight of the vehicle involved and other factors. At its lower end mass 26 is reduced in diameter and provided with annular spiral grooves 28 which are adapted to receive the upper end 30 of a coil spring 32 which is calibrated to regulate the vibrational frequency mass 26. The lower end 34 of spring 32, in turn, engages spiral grooves 36 formed in a sheet metal cup member 38 which is attached to the inner surface of cap 18. Mass 26 is, therefore, normally yieldably maintained in an intermediate position longitudinally of cylindrical member 12. Since spring 32 is positively connected at one end to cup member 38 and at the opposite end to mass 26, the oscillations of the latter induce compression of spring 32 in one direction and tension of the spring in the opposite direction.

In accordance with one feature of the invention, mass 26 slidably embraces central tubular member 24 and thereby eliminates the necessity for precision fit between the outside diameter 40 thereof and the inside wall 42 of cylinder 12. Thus, the outer configuration of mass 26 requires no finish machining except for the provision of a single circumferential groove 44, the purpose of which will be described shortly. To accomplish smooth sliding engagement between tubular member 24 and mass 26, the latter is provided with an axially extending concentric bore 46 of slightly larger diameter than member 24. A pair of suitable anti-friction bushings 48 and 50 are press-fitted into bore 46 in flush relation with the opposite ends 52 and 54 of mass 26. Bushings 48 and 50 are adapted to tightly embrace the ground outside diameter of tubular member 24 and thus guide the mass in vertical oscillations in cylindrical member 12. To provide wiping contacts between mass 26 and the inner wall 42 of cylinder 24, fibrous annular ring 56 is disposed in annular groove 44 and compressibly engages the wall 42.

Since vertical movement of mass 26 in cylinder 24 causes compression to build up in one end and reduced air pressure in the opposite end, tubular member 24 is provided with two ports 58 and 60 which are disposed near opposite ends thereof and communicate between air chambers 62 and 64, respectively. Thus, when the mass moves upwardly, air compressed in chamber 62 escapes through port 58 downwardly through the annular passage 66 out port 60 into chamber 64. In this way, static air pressure on either side of mass 26 remains balanced. However, it will be noted that each port 58 and 60 is spaced from the end caps 16 and 18. Because of this arrangement, under conditions of exceptional stressing causing greater than normal amplitude of vibration of mass 26, ports 58 and 60 function as snubbers. Thus, for example, when the mass 26 moves upwardly until the upper edge thereof closes port 58, further upward movement produces rapid compression of the air confined in the remaining cavity and quickly arrests further vertical movement of the mass and prevents crashing or bottoming of the mass against the end cap. It will be understood that the precise form and location of ports 58 and 60 may vary considerably depending upon the response desired.

In accordance with another feature of the invention, ports 58 and 60 operate to restrict or dampen the normal amplitude of oscillation of mass 26 in order to increase the tolerance of the mechanism to wide variation in amplitude of wheel hop. It will be evident any desired degree of damping may be attained by variation in size of ports 58 and 60. In order to assure optimum efficiency of the damping means, it has been found preferable to introduce a minute quantity of low viscosity lubricant into the interior of cylinder 12. In operation, the rapid oscillations of mass 26 create considerable turbulence which tends to cause mixing of the lubricant with the air contained in the cylinder. The fine mist thus provided constantly lubricates the inner wall of cylinder 12 and prevents pressure leakage past seal 56. Consequently, all air movement is regulated by ports 58 and 60.

In Fig. 4, there is shown a modification of the invention wherein a mass 68 is confined in cylindrical member 70 and slidably disposed on a concentrically arranged tubular member 72. In the modification shown, mass 68 is symmetrical in configuration and adapted to be positioned yieldably intermediately of cylinder 70 by means of a pair of identical opposed coil springs 74 and 76. By virtue of the modified construction, certain simplification of the mass 68 is permissible and more uniform resilient characteristics may be obtained. However, in other respects, the construction and mode of operation are identical with that previously described with respect to Fig. 3.

While two embodiments have been shown and described, it is apparent that other changes and modifications may be made therein. It is to be understood, therefore, that it is not intended to limit the invention to the embodiments shown, but only by the scope of the claims which follow.

We claim:

1. A dynamic vibration damper comprising a closed cylinder, a hollow shaft rigidly connected to said cylinder in concentric relation therewith, a free annular weight slidably supported by said shaft, resilient means yieldably maintaining said weight intermediate the opposite ends of said cylinder, flexible means on said weight providing wiping contact with the inner wall of said cylinder, and means associated with said shaft for damping oscillation of said weight, said means comprising a passage extending between opposite ends of said cylinder and adapted to restrict flow of air therebetween.

2. A dynamic vibration damper comprising a closed cylinder, a hollow shaft rigidly secured in concentric relation interiorly of said cylinder, a freely oscillatable annular weight slidably supported by said shaft, means forming a circumferential groove in said weight, resilient means yieldably maintaining said weight intermediate the opposite ends of said cylinder, a circular flexible ring disposed in said groove, said ring being compressed between said groove and the wall of said cylinder to provide wiping contact therebetween, and means adapted to permit restricted flow of air from one end of said cylinder into the other end upon movement of said weight towards said one end whereby to dampen the amplitude of oscillation of said weight.

3. A dynamic vibration damper comprising a closed cylindrical casing, a hollow shaft rigidly secured concentrically therein, a freely oscillatable enertia responsive weight slidable on and supported by said shaft, bearing means disposed on said weight and slidably embracing said shaft, spring means yieldably maintaining said weight intermediate the opposite ends of said casing, and snubbing means for arresting slidable movement of said weight in said casing, said means comprising valve means at opposite ends of said shaft providing communication between said casing and said hollow shaft, said valve means being closable upon movement of said weight to a predetermined position at either end of said casing, whereby further movement of said weight is resisted by compression of air trapped in the ends of said casing.

4. A dynamic vibration damper comprising a closed cylindrical casing, a hollow shaft rigidly secured concentrically therein, a freely slidable annular weight in said casing, said weight having a bore surrounding said shaft, axially aligned bearing means secured in said bore and slidably embracing said shaft, spring means at either end of said weight yieldably maintaining the latter intermediate the opposite ends of said casing, and snubbing means for arresting slidable movement of said weight in said casing, said means comprising valve means at opposite ends of said shaft providing communication between said casing and said hollow shaft, said valve means being closable upon movement of said weight to a predetermined position at either end of said casing, whereby further movement of said weight is resisted by compression of air trapped in the ends of said casing.

5. A dynamic vibration damper comprising a cylindrical casing, a hollow shaft rigidly secured concentrically therein, an inertia responsive weight slidably supported by said shaft, bearing means secured to said weight and slidably embracing said shaft, spring means yieldably maintaining said weight intermediate the opposite ends of said casing, and snubbing means for yieldably arresting slidable movement of said weight in said casing, said means comprising valve means at opposite ends of said shaft providing communication between said casing and said hollow shaft, said valve means being closable upon movement of said weight to a predetermined position at either end of said casing whereby further movement of said weight is resisted by progressively increasing air pressure trapped in said cylinder ends.

6. A dynamic vibration damper comprising a closed cylindrical casing, a hollow shaft rigidly secured concentrically therein, a freely oscillatable cast annular weight surrounding said shaft, spaced axially aligned bearing means formed centrally of said weight and slidably embracing said shaft, spring means yieldably maintaining said weight intermediate the opposite ends of said casing, and snubbing means for arresting slidable movement of said weight in said casing, said means comprising valve means at opposite ends of said shaft providing communication between said casing and said hollow shaft, said valve means being closable upon movement of said weight to a predetermined position at either end of said casing whereby further movement of said weight is resisted by progressive compression of air trapped between said weight and said cylinder end.

7. A dynamic absorber type vibration damper comprising a closed cylindrical casing, a hollow shaft rigidly secured concentrically therein, a cast annular weight surrounding said shaft, the outside diameter of said weight being substantially smaller than the inside diameter of said casing, spaced axially aligned bearing means formed centrally of said weight and slidably embracing said shaft, to guide said weight in said casing, circular seal means carried by said weight and movable along the wall of said casing, spring means yieldably maintaining said weight intermediate the opposite ends of said casing, and snubbing means for arresting slidable movement of said weight in said casing, said means comprising normally open valve means at opposite ends of said shaft providing communication between said casing and said hollow shaft, said valve means being closable by said bearing means upon movement of said weight to a predetermined position at either end of said casing whereby further movement of said weight is resisted by progressive compression of air trapped between said weight and said cylinder end.

References Cited in the file of this patent

UNITED STATES PATENTS

| | | |
|---|---|---|
| 782,964 | Hopkinson | Feb. 21, 1905 |
| 1,368,429 | Goergen et al. | Feb. 15, 1921 |
| 1,744,332 | Paton et al. | Jan. 21, 1930 |
| 1,783,348 | Taylor | Dec. 2, 1930 |
| 1,867,708 | Paton | July 19, 1932 |
| 2,015,758 | Moulton | Oct. 1, 1935 |
| 2,051,954 | Leland | Aug. 25, 1936 |
| 2,342,381 | Thornhill | Feb. 22, 1944 |
| 2,450,731 | Johnson | Oct. 5, 1948 |